(12) United States Patent
Murakami

(10) Patent No.: US 8,412,140 B2
(45) Date of Patent: *Apr. 2, 2013

(54) METHOD OF CANCELING NOISE CONTAINED IN RECEIVED SIGNAL

(75) Inventor: Makoto Murakami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 258 days.

This patent is subject to a terminal disclaimer.

(21) Appl. No.: 12/950,477

(22) Filed: Nov. 19, 2010

(65) Prior Publication Data

US 2011/0065405 A1 Mar. 17, 2011

Related U.S. Application Data

(63) Continuation of application No. 11/959,088, filed on Dec. 18, 2007, now Pat. No. 7,860,475.

(30) Foreign Application Priority Data

Dec. 26, 2006 (JP) ................................. 2006-349551

(51) Int. Cl.
*H04B 1/10* (2006.01)
*H04B 17/00* (2006.01)

(52) U.S. Cl. ...................... 455/296; 455/67.13; 375/346

(58) Field of Classification Search ............... 455/67.11, 455/67.13, 226.1, 226.2, 296, 344, 345, 556.1; 375/346

See application file for complete search history.

(56) References Cited

U.S. PATENT DOCUMENTS 6,510,308 B1   1/2003   Thomas et al.

FOREIGN PATENT DOCUMENTS

| JP | 09-153827 A | 6/1997 |
|---|---|---|
| JP | 2003-507954 A | 2/2003 |
| JP | 2006-145315 A | 6/2006 |
| JP | 2006-180373 A | 7/2006 |

*Primary Examiner* — Quochien B Vuong
(74) *Attorney, Agent, or Firm* — Global IP Counselors, LLP

(57) ABSTRACT

A multiplication section multiplies a signal output from a GPS antenna by a local oscillation signal generated by a local oscillation signal generation section to down-convert the signal output from the GPS antenna into an intermediate-frequency signal. A sampling circuit section samples a generated signal generated by a portable electronic circuit using a sampling clock signal having a frequency lower than a frequency of the generated signal. An attenuation section generates a cancellation signal by attenuating the sampled signal, and an addition section adds the cancellation signal to the signal output from the multiplication section to cancel in-band noise superimposed on the received signal.

10 Claims, 6 Drawing Sheets

METHOD OF CANCELING NOISE CONTAINED IN RECEIVED SIGNAL

This is a continuation application of U.S. patent application Ser. No. 11/959,088 which claims priority to Japanese Patent Application No. 2006-349551 filed on Dec. 26, 2006. The entire disclosure of U.S. patent application Ser. No. 11/959,088 and Japanese Patent Application No. 2006-349551 is hereby incorporated by reference.

BACKGROUND OF THE INVENTION

The present invention relates to a signal reception method, a receiver circuit, a noise cancellation circuit, and an electronic instrument.

In an electronic instrument including a receiver circuit, an alternating current signal may be generated due to a change in electromagnetic field accompanying the circuit operation of an electronic circuit disposed near the receiver circuit. The alternating current signal may be transmitted to the receiver circuit and mixed into the received signal as an interference wave. Such a phenomenon causes a signal to deteriorate to a large extent. Therefore, various technologies have been proposed to remove an interference wave superimposed on a received signal.

For example, JP-A-2006-145315 discloses technology which reverses the phase of a signal generated by an electronic circuit using a delay line to generate a signal (hereinafter referred to as "cancellation signal") which cancels the generated signal, thereby removing an interference wave.

A signal generated by an electronic circuit generally has a high frequency. Therefore, a high-frequency signal is generated from a signal line and serves as an interference wave when generating a cancellation signal from a signal generated by an electronic circuit and adding the cancellation signal to the received signal.

SUMMARY

According to one aspect of the invention, there is provided a signal reception method comprising:

multiplying a received signal by a local oscillation signal that is generated by a local oscillation signal generation section to convert the received signal into an intermediate-frequency signal, the received signal being a specific radio signal received by an antenna section;

sampling a generated signal using a sampling clock signal that has a specific frequency lower than a frequency of the generated signal, the generated signal being generated by an electronic circuit disposed near the antenna section;

adding the sampled signal to the intermediate-frequency signal; and extracting a component in a band corresponding to an intermediate frequency of the radio signal from the signal obtained by the addition.

According to another aspect of the invention, there is provided a receiver circuit comprising:

an antenna section that receives a radio signal and outputs the radio signal as a received signal;

a local oscillation signal generation section;

an intermediate frequency conversion section that multiplies the received signal by a local oscillation signal generated by the local oscillation signal generation section to convert the received signal into an intermediate-frequency signal;

a sampling circuit section that samples a generated signal using a sampling clock signal that has a specific frequency lower than a frequency of the generated signal, the generated signal being generated by an electronic circuit disposed near the antenna section;

an addition section that adds the signal sampled by the sampling circuit section to the intermediate-frequency signal converted by the intermediate frequency conversion section; and a filtering section that extracts a component in a band corresponding to an intermediate frequency of the radio signal from the signal obtained by the addition section.

According to a further aspect of the invention, there is provided a noise cancellation circuit that cancels noise superimposed on a signal in a received signal processing system that converts a received signal received by antenna section that receives a radio signal into an intermediate-frequency signal by multiplying the received signal by a local oscillation signal generated by a local oscillation signal generation section, and extracts a component in a band corresponding to an intermediate frequency of the radio signal using a filtering section, the noise cancellation circuit comprising:

a sampling clock signal generation section that divides a frequency of the local oscillation signal generated by the local oscillation signal generation section so that the local oscillation signal has a specific frequency lower than a frequency of a signal generated by an electronic circuit disposed near the antenna section, and shifts a phase of the resulting signal by 180 degrees to generate a sampling clock signal; and a sampling circuit section that samples the generated signal generated by the electronic circuit using the sampling clock signal generated by the sampling clock signal generation section, noise due to the generated signal superimposed on the signal in the received signal processing system being canceled by adding the signal sampled by the sampling circuit section to the intermediate-frequency signal that has not passed through the filtering section.

DETAILED DESCRIPTION OF THE EMBODIMENT

Figure 1:
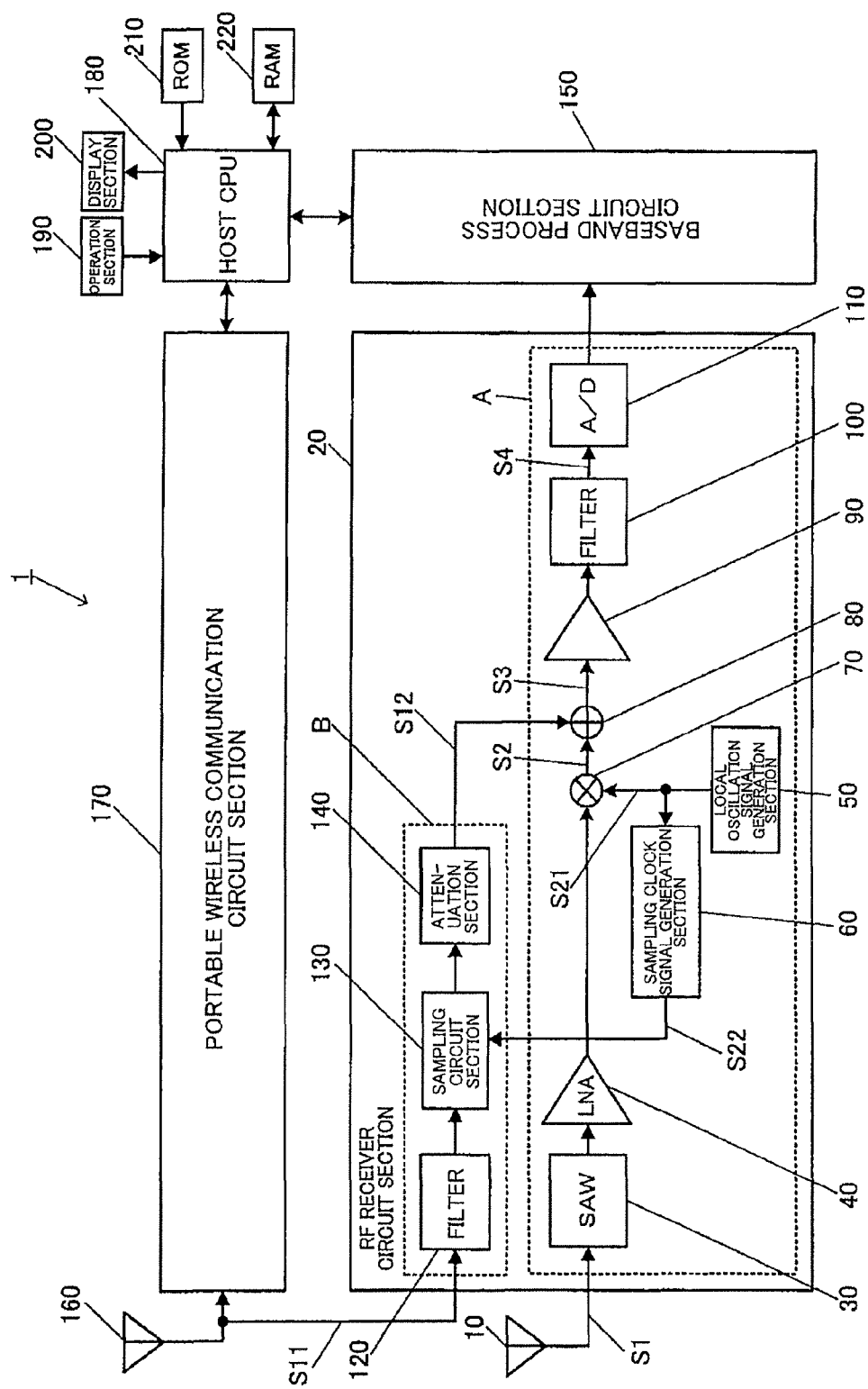
FIG. 1 is a block diagram showing the configuration of a portable telephone.

According to one embodiment of the invention, there is provided a signal reception method comprising:

multiplying a received signal by a local oscillation signal that is generated by a local oscillation signal generation section to convert the received signal into an intermediate-frequency signal, the received signal being a specific radio signal received by an antenna section;

sampling a generated signal using a sampling clock signal that has a specific frequency lower than a frequency of the generated signal, the generated signal being generated by an electronic circuit disposed near the antenna section;

adding the sampled signal to the intermediate-frequency signal; and extracting a component in a band corresponding to an intermediate frequency of the radio signal from the signal obtained by the addition.

According to another embodiment of the invention, there is provide a receiver circuit comprising:

an antenna section that receives a radio signal and outputs the radio signal as a received signal;

a local oscillation signal generation section;

an intermediate frequency conversion section that multiplies the received signal by a local oscillation signal generated by the local oscillation signal generation section to convert the received signal into an intermediate-frequency signal;

a sampling circuit section that samples a generated signal using a sampling clock signal that has a specific frequency lower than a frequency of the generated signal, the generated signal being generated by an electronic circuit disposed near the antenna section;

an addition section that adds the signal sampled by the sampling circuit section to the intermediate-frequency signal converted by the intermediate frequency conversion section; and a filtering section that extracts a component in a band corresponding to an intermediate frequency of the radio signal from the signal obtained by the addition section.

According to the above configuration, a signal received by the antenna section is multiplied by the local oscillation signal and converted into an intermediate-frequency signal. A signal generated by the electronic circuit disposed near the antenna section is sampled using the sampling clock signal having a frequency lower than that of the generated signal. The converted intermediate-frequency signal is added to the sampled signal, whereby noise superimposed on the received signal is canceled.

The signal generated by the electronic circuit is converted into a low-frequency signal by under-sampling the generated signal. Therefore, a high-frequency signal generated by the electronic circuit need not be transmitted over a long signal line by sampling the signal near the electronic circuit. As a result, a high-frequency signal generated from the signal line can be effectively reduced.

According to the above configuration, since the signal generated by the electronic circuit is converted into a low-frequency signal due to under-sampling, the circuit configuration can be simplified.

Note that noise in a band other than the band corresponding to the intermediate frequency of the radio signal may remain in the signal obtained as a result of the addition. However, such noise is removed when extracting a signal component.

In the signal reception method according to this embodiment, the method may further include generating the sampling clock signal by dividing a frequency of the local oscillation signal generated by the local oscillation signal generation section and shifting a phase of the resulting signal by 180 degrees.

In the receiver circuit according to this embodiment, the receiver circuit may further include:

a sampling clock signal generation section that generates the sampling clock signal by dividing a frequency of the local oscillation signal generated by the local oscillation signal generation section and shifting a phase of the resulting signal by 180 degrees, and the sampling circuit section may sample the generated signal using the sampling clock signal generated by the sampling clock signal generation section.

According to the above configuration, the sampling clock signal is generated by dividing the frequency of the local oscillation signal and shifting the phase of the resulting signal by 180 degrees. In this case, the phase of the signal sampled using the generated sampling clock signal is the reverse of that of the signal generated by the electronic circuit. Therefore, noise superimposed on the received signal is canceled by the sampled signal.

In the receiver circuit according to this embodiment, a wiring length from the local oscillation signal generation section to the sampling clock signal generation section may be smaller than a wiring length from the sampling clock signal generation section to the sampling circuit section.

The local oscillation signal generated by the local oscillation signal generation section has a frequency higher than that of the sampling clock signal due to frequency division by the sampling clock signal generation section. Since the signal path length of the high-frequency local oscillation signal is smaller than the signal path length of the low-frequency sampling clock signal, leakage of the local oscillation signal can be reduced.

In the receiver circuit according to this embodiment, a wiring length from the electronic circuit to the sampling circuit section may be smaller than a wiring length from the sampling circuit section to the addition section.

The signal generated by the electronic circuit has a frequency higher than that of the sampling clock signal. Since the signal path length of the high-frequency generated signal is smaller than the signal path length of the low-frequency sampling clock signal, a high-frequency signal which may be generated from the signal path of the generated signal can be reduced.

In the signal reception method according to this embodiment, the sampling of the generated signal may include: sampling a signal component in a frequency band of the radio signal from the generated signal using the sampling clock signal.

In the receiver circuit according to this embodiment, the receiver circuit may further include a generated signal filtering section that extracts a component in a frequency band of the radio signal from the generated signal, the sampling circuit section may sample the generated signal that has passed through the generated signal filtering section.

According to the above configuration, the generated signal in the frequency band of the extracted radio signal is sampled.

In the signal reception method according to this embodiment, the method may further include:

attenuating the sampled signal, and the adding may include: adding the attenuated signal to the intermediate-frequency signal.

In the receiver circuit according to this embodiment, the receiver circuit may further include an attenuation section that attenuates the signal sampled by the sampling circuit section, the addition section may add the signal that has passed through the attenuation section to the intermediate-frequency signal.

According to the above configuration, the sampled signal is attenuated and then added to the intermediate-frequency signal.

In the signal reception method according to this embodiment, an attenuation factor of the attenuation may be set in advance at such a value that an amount of noise component contained in the extracted signal becomes a minimum.

In the receiver circuit according to this embodiment, an attenuation factor of the attenuation section may be set in advance at such a value that an amount of noise component contained in the signal output from the filtering section becomes a minimum.

According to the above configuration, a signal for which the attenuation factor has been adjusted so that the amount of noise component contained in the extracted signal is minimized is added to the intermediate-frequency signal.

In the signal reception method according to this embodiment, the method may further include controlling an attenuation factor of the attenuation based on a signal level of the extracted signal.

In the receiver circuit according to this embodiment, the receiver circuit may further include:

an attenuation factor control section that generates a control signal based on a signal level of the signal output from the filtering section, the control signal controlling the attenuation factor of the attenuation section, and the attenuation section may attenuate the signal sampled by the sampling circuit section by the attenuation factor corresponding to the control signal generated by the attenuation factor control section.

According to the above configuration, the attenuation factor is changed based on the signal level of the extracted signal. Therefore, noise superimposed on the received signal can be appropriately cancelled by setting the attenuation factor at such a value that the signal level of the extracted signal becomes a minimum, for example.

According to a further embodiment of the invention, there is provided an electronic instrument comprising the above receiver circuit, the receiver circuit receiving a satellite signal from a positioning satellite.

According to the above configuration, noise superimposed on the satellite signal from the positioning satellite is canceled in combination with the above effects of the receiver circuit.

According to a further embodiment of the invention, there is provided a noise cancellation circuit that cancels noise superimposed on a signal in a received signal processing system that converts a received signal received by antenna section that receives a radio signal into an intermediate-frequency signal by multiplying the received signal by a local oscillation signal generated by a local oscillation signal generation section, and extracts a component in a band corresponding to an intermediate frequency of the radio signal using a filtering section, the noise cancellation circuit comprising:

a sampling clock signal generation section that divides a frequency of the local oscillation signal generated by the local oscillation signal generation section so that the local oscillation signal has a specific frequency lower than a frequency of a signal generated by an electronic circuit disposed near the antenna section, and shifts a phase of the resulting signal by 180 degrees to generate a sampling clock signal; and a sampling circuit section that samples the generated signal generated by the electronic circuit using the sampling clock signal generated by the sampling clock signal generation section, noise due to the generated signal superimposed on the signal in the received signal processing system being canceled by adding the signal sampled by the sampling circuit section to the intermediate-frequency signal that has not passed through the filtering section.

This provides a noise cancellation circuit which achieves the same effects as those of the above receiver circuit.

According to a further embodiment of the invention, there is provided an electronic instrument comprising:

the above noise cancellation circuit;

a receiver circuit that is the received signal processing system; and the electronic circuit disposed near the antenna section.

In the electronic instrument according to this embodiment, the electronic circuit may be a wireless communication circuit disposed at a specific position.

In the electronic instrument according to this embodiment, the electronic instrument may be a portable telephone;

the receiver circuit may be a circuit that receives a GPS satellite signal; and the wireless communication circuit may be a portable telephone communication circuit.

According to the above configuration, the portable telephone can cancel noise from the portable telephone communication circuit superimposed on the received GPS satellite signal.

Embodiments of the invention are described below with reference to the drawings. Note that the embodiments described below do not in any way limit the scope of the invention laid out in the claims. Note that all elements of the embodiments described below should not necessarily be taken as essential requirements for the invention.

Embodiments when applying the invention to a portable telephone (electronic instrument) having a navigation function are described below with reference to the drawings.

1. Configuration

FIG. 1 is a block diagram showing the functional configuration of a portable telephone 1 according to one embodiment of the invention. The portable telephone 1 includes a GPS antenna 10, a radio frequency (RF) receiver circuit section 20, a baseband process circuit section 150, a portable antenna 160, a portable wireless communication circuit section 170, a host central processing unit (CPU) 180, an operation section 190, a display section 200, a read only memory (ROM) 210, and a random access memory (RAM) 220.

The RF receiver circuit section 20 and the baseband process circuit section 150 of the portable telephone 1 may be produced as different large scale integrated (LSI) circuits, or may be produced in one chip.

A GPS satellite signal receiver section including the GPS antenna 10 and the RF receiver circuit section 20 is hereinafter referred to as "GPS receiver section", and a portable telephone electronic circuit including the portable antenna 160 and the portable wireless communication circuit section 170 is hereinafter referred to as "portable electronic circuit".

The portable electronic circuit and the GPS antenna 10 or the RF receiver circuit section 20 are disposed in the portable telephone 1 at nearby positions. As a result, an alternating current signal generated due to a change in electromagnetic field caused by the circuit operation of the portable electronic circuit is superimposed on a signal (received signal) received by the GPS antenna 10 as an interference wave. In particular, since the portable electronic circuit transmits and receives a radio wave in a frequency band of 1.7 GHz or 2.0 GHz near the frequency of the GPS satellite signal (1.5 GHz band), the portable telephone signal (particularly side-lobe signal) is superimposed as an interference wave.

The GPS antenna 10 is an antenna which receives an RF signal including a GPS satellite signal (radio signal) transmitted from a GPS satellite. The GPS antenna 10 outputs a received signal S1 to the RF receiver circuit section 20.

The RF receiver circuit section 20 is an RF signal receiver circuit which includes a surface acoustic wave (SAW) filter 30, a low noise amplifier (LNA) 40, a local oscillation signal generation section 50, a sampling clock signal generation section 60, a multiplication section 70, an addition section 80, an amplifier section 90, a filter 100, an analog/digital (A/D) conversion section 110, a filter 120, a sampling circuit section 130, and an attenuation section 140.

A circuit section including the SAW filter 30, the LNA 40, the local oscillation signal generation section 50, the sampling clock signal generation section 60, the multiplication section 70, the addition section 80, the amplifier section 90, the filter 100, and the A/D conversion section 110 of the RF receiver circuit section 20 and a circuit section including the filter 120, the sampling circuit section 130, and the attenuation section 140 may be integrated in one module, or may be formed as different modules A and B. The attenuation section 140 may be incorporated in the module A instead of the module B.

The SAW filter 30 is a bandpass filter which allows a specific frequency band component of the signal S1 output from the GPS antenna 10 to pass through, and outputs a signal which has passed through to the LNA 40.

The LNA 40 is a low-noise amplifier which amplifies the signal which has passed through the SAW filter 30, and outputs the amplified signal to the multiplication section 70.

The local oscillation signal generation section 50 is a circuit section which includes an oscillator such as a local oscillator (LO) and generates an RF signal multiplication local oscillation signal S21. The local oscillation signal generation section 50 outputs the generated local oscillation signal S21 to the sampling clock signal generation section 60 and the multiplication section 70.

The sampling clock signal generation section 60 is a circuit section which is disposed near the local oscillation signal generation section 50 and generates a clock signal (hereinafter referred to as "sampling clock signal") for the sampling circuit section 130 to sample a signal S11 generated by the portable electronic circuit based on the local oscillation signal S21 generated by the local oscillation signal generation section 50. The sampling clock signal generation section 60 outputs the generated sampling clock signal S22 to the sampling circuit section 130.

Figure 2:
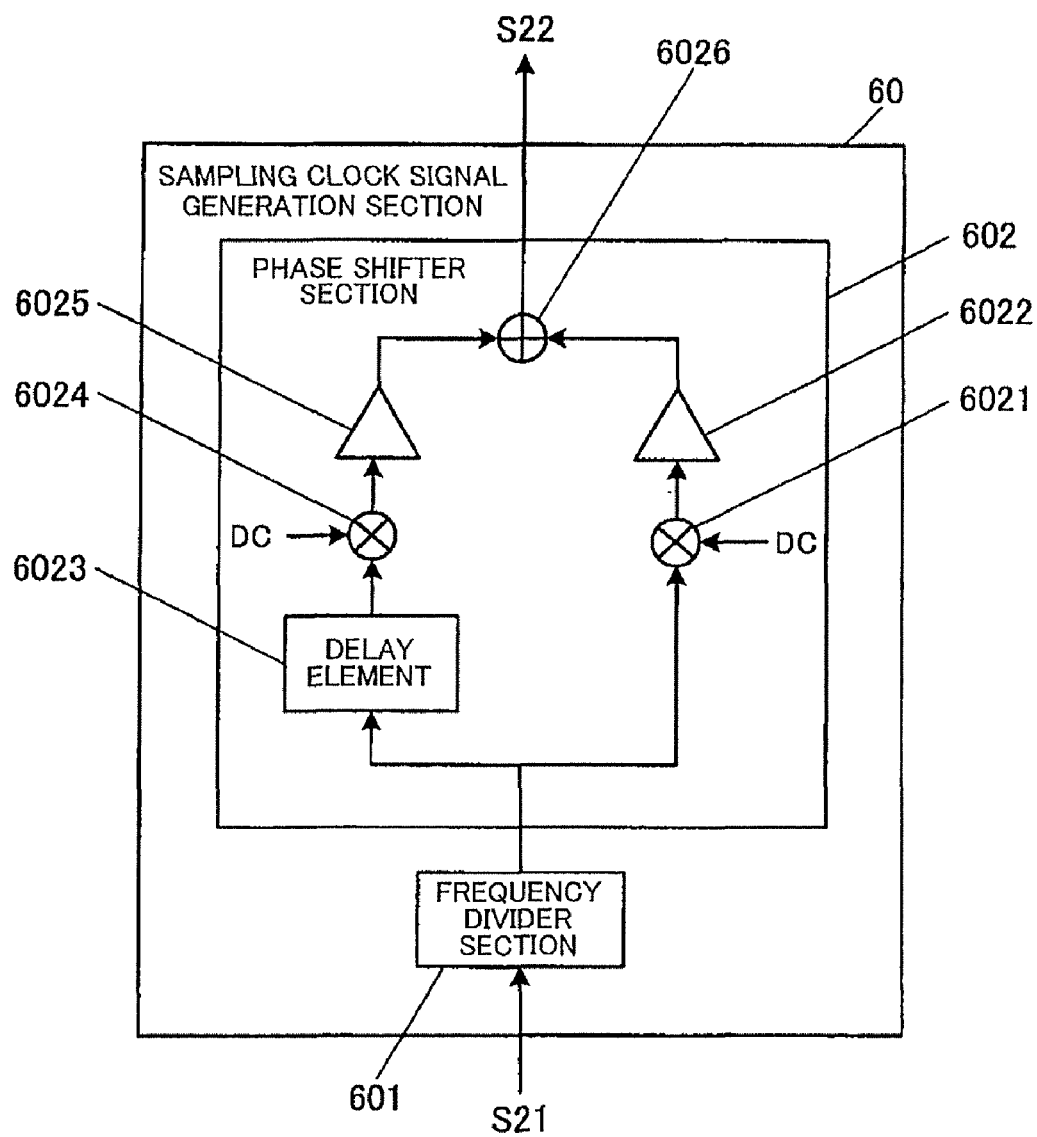
FIG. 2 is a view showing an example of the circuit configuration of a sampling clock signal generation section.

FIG. 2 is a view showing an example of the circuit configuration of the sampling clock signal generation section 60. The sampling clock signal generation section 60 includes a frequency divider section 601 and a phase shifter section 602.

The frequency divider section 601 is a frequency divider which divides the frequency of the local oscillation signal S21. The frequency divider section 601 divides the frequency of the local oscillation signal S21 by about several M to several hundreds of M (preferably about several tens of M). The resulting signal is output to the phase shifter section 602 as a frequency-divided signal. As a result of frequency division by the frequency divider section 601, the sampling clock signal S22 has a frequency sufficiently lower than the frequencies of the signal S11 generated by the portable electronic circuit and the local oscillation signal S21.

The phase shifter section 602 is a phase shifter circuit which shifts the phase of the frequency-divided signal output from the frequency divider section 601 by 180 degrees. The phase shifter section 602 includes a direct current signal multiplication section 6021, an in-phase signal amplification section 6022, a delay element 6023, a direct current signal multiplication section 6024, a quadrature signal amplification section 6025, and an addition section 6026. The phase shifter section 602 has a configuration in which a phase shifter is formed using a quadrature modulator. Note that the phase shifter section 602 may have another configuration.

The direct current signal multiplication section 6021 is a multiplier which multiplies the frequency-divided signal by a direct current (DC) signal generated by dividing a specific voltage, for example. The direct current signal multiplication section 6021 outputs a multiplication result signal to the in-phase signal amplification section 6022 as an in-phase signal (I signal) of the frequency-divided signal.

The in-phase signal amplification section 6022 is an amplifier which amplifies the in-phase signal output from the direct current signal multiplication section 6021 by a specific amplification factor. The in-phase signal amplification section 6022 outputs the amplified signal to the addition section 6026.

The delay element 6023 delays the phase of the frequency-divided signal by 90 degrees. The delay element 6023 outputs the delayed signal to the direct current signal multiplication section 6024.

The direct current signal multiplication section 6024 is a multiplier which multiplies the signal output from the delay element 6023 by a direct current signal generated by dividing a specific voltage, for example. The direct current signal multiplication section 6024 outputs a multiplication result signal to the quadrature signal amplification section 6025 as a quadrature signal (Q signal) of the frequency-divided signal.

The quadrature signal amplification section 6025 is an amplifier which amplifies the quadrature signal output from the quadrature signal multiplication section 6024 by a specific amplification factor. The quadrature signal amplification section 6025 outputs the amplified signal to the addition section 6026.

The addition section 6026 is an adder which adds the in-phase signal amplified by the in-phase signal amplification section 6022 to the quadrature signal amplified by the quadrature signal amplification section 6025. The addition section 6026 outputs an addition result signal to the sampling circuit section 130 as the sampling clock signal S22.

The sampling clock signal S22 output to the sampling circuit section 130 is the frequency-divided signal of which the phase has been shifted by 180 degrees by setting the gains of the in-phase signal amplification section 6022 and the quadrature signal amplification section 6025 at −1.

The sampling clock signal generation section 60 is disposed near the local oscillation signal generation section 50 so that the wiring length from the local oscillation signal generation section 50 to the sampling clock signal generation section 60 becomes as small as possible taking the circuit layout into consideration. The local oscillation signal S21 has a frequency higher than that of the sampling clock signal S22. Leakage of a signal from the signal path (signal line) of the high-frequency local oscillation signal S21 can be reduced by disposing the sampling clock signal generation section 60 near the local oscillation signal generation section 50 so that the wiring length from the local oscillation signal generation section 50 to the sampling clock signal generation section 60 is smaller than the wiring length from the sampling clock signal generation section 60 to the sampling circuit section 130.

The multiplication section 70 down-converts the RF signal into an intermediate-frequency signal (hereinafter referred to as "IF signal") S2 by multiplying the signal amplified by the LNA 40 by the local oscillation signal S21 generated by the local oscillation signal generation section 50, and outputs the resulting signal to the addition section 80.

The addition section 80 includes an adder which adds a cancellation signal S12 output from the attenuation section 140 to the IF signal S2 output from the multiplication section 70. The addition section 80 outputs an addition result signal S3 to the amplifier section 90.

The amplifier section 90 is an amplifier which amplifies the signal S3 output from the addition section 80 by a specific amplification factor. The amplifier section 90 outputs the amplified signal to the filter 100.

The filter 100 is a bandpass filter which allows a component of the signal amplified by the amplification section 90 in a specific frequency band including the frequency band of the signal component of the IF signal to pass through, and outputs a signal S4 which has passed through to the A/D conversion section 110.

The A/D conversion section 110 is an A/D converter which converts an analog signal into a digital signal. The A/D conversion section 110 converts the signal S4 which has passed through the filter 100 into a digital signal, and outputs the resulting digital signal to the baseband process circuit section 150.

The filter 120 is a bandpass filter which allows a component of the signal S11 generated by the portable electronic circuit in a specific frequency band including the frequency band of the GPS satellite signal to pass through, and outputs a signal which has passed through to the sampling circuit section 130.

The sampling circuit section 130 is a sampling circuit which is disposed near the portable electronic circuit and samples the signal which has passed through the filter 120 using the sampling clock signal S22 generated by the sampling clock signal generation section 60. The sampling circuit section 130 outputs the sampled signal (hereinafter referred to as "sampled signal") to the attenuation section 140.

The frequency of the sampling clock signal S22 is sufficiently lower than the frequency of the generated signal S11 due to frequency division by the frequency divider section 601. Therefore, the sampling circuit section 130 undersamples the generated signal S11. The phase of the sampling clock signal S22 has been shifted by the phase shifter section 602 to be the reverse of the phase of the local oscillation signal S21. Therefore, the sampled signal sampled by the sampling circuit section 130 has a phase which is the reverse of that of the signal S2 output from the multiplication section 70.

The attenuation section 140 is an attenuator which attenuates the sampled signal output from the sampling circuit section 130 by a specific attenuation factor (gain). The attenuation section 140 outputs the attenuated signal to the addition section 80 as the cancellation signal S12. The attenuation factor is designed and set in advance at such a value that the amount of noise component of the signal which has passed through the filter 100 becomes a minimum. It is preferable to set the attenuation factor of the attenuation section 140 in the stage prior to production after the circuit layout and the like of the portable telephone 1 have been determined.

The sampling circuit section 130 is disposed near the portable electronic circuit so that the wiring length from the portable electronic circuit to the sampling circuit section 130 becomes as small as possible taking the circuit layout into consideration. The signal S11 generated by the portable electronic circuit has a frequency higher than those of the sampling clock signal S22 and the sampled signal output from the sampling circuit section 130. Leakage of a signal from the signal path (signal line) of the high-frequency generated signal S11 can be reduced by disposing the sampling circuit section 130 near the portable electronic circuit so that the wiring length from the portable electronic circuit to the sampling circuit section 130 is smaller than the wiring length from the sampling circuit section 130 to the addition section 80.

The baseband process circuit section 150 is a circuit section which acquires/extracts the GPS satellite signal by performing a correlation detection process and the like on the if signal output from the RF conversion circuit section 20, decodes data contained in the GPS satellite signal to acquire a navigation message, time information, and the like, and performs pseudo-range calculations, positioning calculations, and the like. The GPS satellite signal is a spread spectrum modulated signal called a coarse and acquisition (C/A) code.

The portable antenna 160 is an antenna which transmits and receives a portable radio signal between the portable telephone 1 and a radio base station installed by a portable telephone communication service provider The portable wireless communication circuit section 170 is a portable telephone communication circuit section which includes an RF conversion circuit, a baseband process circuit, and the like. The portable wireless communication circuit section 170 implements a telephone call, e-mail transmission/reception, and the like by modulating/demodulating the portable radio signal, for example.

The host CPU 180 is a processor which controls each section of the portable telephone 1 based on various programs such as a system program stored in the ROM 210. The host CPU 180 mainly controls the telephone function, and causes the display section 200 to display a navigation screen in which the present position of the portable telephone 1 located by the baseband process circuit section 150 is plotted.

The operation section 190 is an input device including an operation key, a button switch, and the like. The operation section 190 outputs a press signal to the host CPU 180. Various instruction inputs such as a telephone call request and a navigation screen display request are performed by operating the operation section 190.

The display section 200 is a display device which includes a liquid crystal display (LCD) or the like, and displays various images based on a display signal input from the host CPU 180. The display section 200 displays date and time information, a navigation screen, and the like.

The ROM 210 is a read-only storage device. The ROM 210 stores data and various programs such as a system program which controls the portable telephone 1, a program which implements a telephone call and e-mail transmission/reception, and a program which implements a navigation function. The host CPU 180 performs a process based on these programs and data.

The RAM 220 is a readable/writable storage device. The RAM 220 serves as a work area which temporarily stores the system program executed by the host CPU 180, various processing programs, data processed during various processes, processing results, and the like.

2. Principle and Operation

Figure 3:
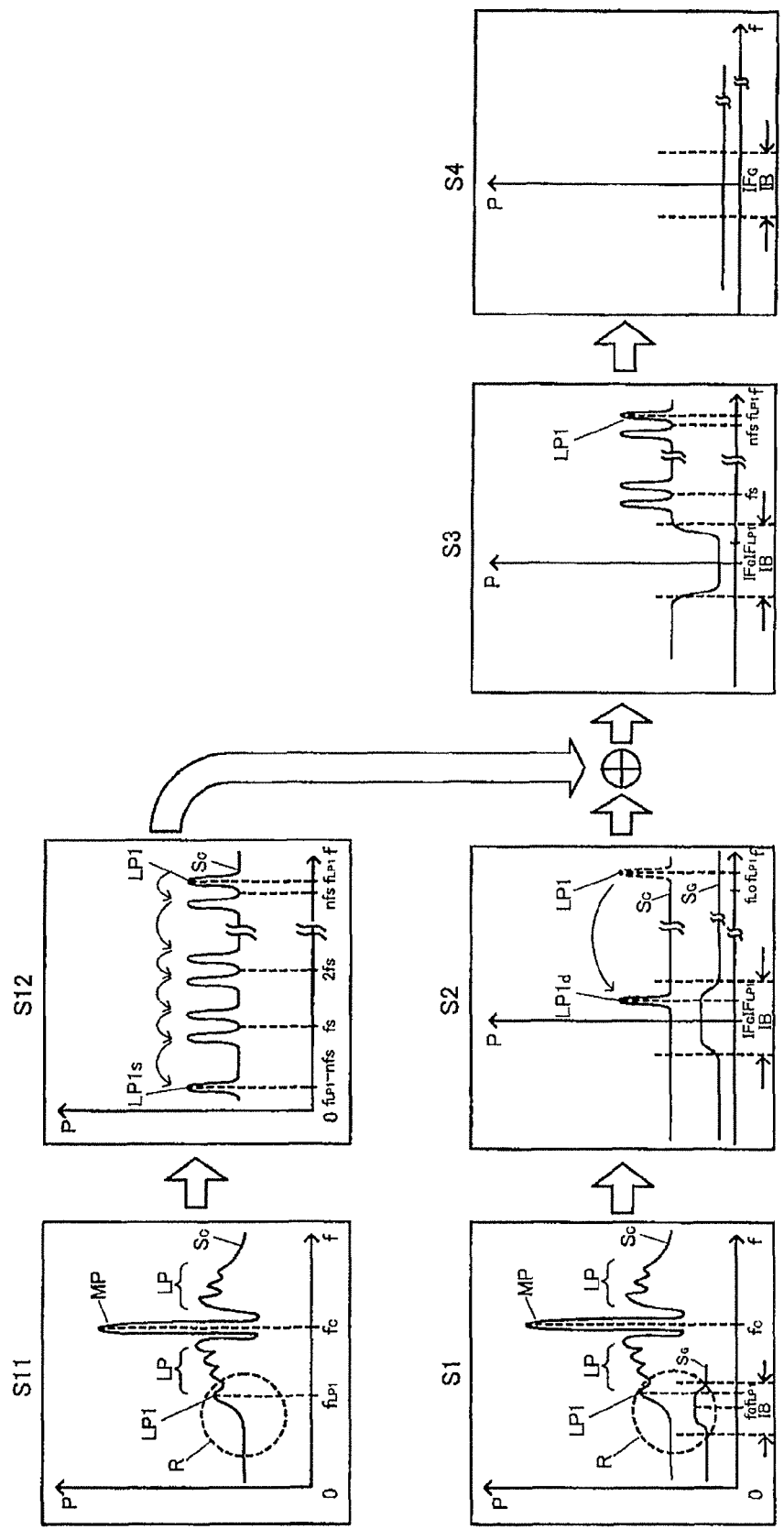
FIG. 3 is a view illustrative of an interference wave removal principle.

FIG. 3 is a view illustrative of an interference wave removal principle. In FIG. 3, the horizontal axis indicates frequency (f), and the vertical axis indicates signal level (P). FIG. 3 schematically shows the frequency spectra of the signals S1, S2, S3, S4, S11, and S12 shown in FIG. 1. In FIG. 3, the frequency spectra of the signals S2, S3, S4, and S12 are enlarged in a region R around an in-band IB of the GPS satellite signal in order to concisely illustrate the features of this embodiment.

The signal 51 output from the GPS antenna 10 to the RF receiver circuit section 20 is a GPS satellite signal on which various types of noise are superimposed. As such noise, a portable radio signal transmitted from the portable electronic circuit disposed near the RF receiver circuit section 20 to the GPS receiver section is constantly superimposed on the GPS satellite signal. In the diagrams of the signals 51 and S2, the frequency spectrum of the GPS satellite signal is indicated by $S_G$, and the frequency spectrum of the portable radio signal is indicated by $S_C$.

The GPS satellite signal is a 1.5 GHz-band signal in which a carrier at a frequency of 1.57542 GHz (hereinafter referred to as "GPS frequency") is spread. The GPS satellite signal is a weak signal as compared with the portable radio signal. A specific band around a GPS frequency $f_G$ is hereinafter referred to the in-band IB.

The frequency of the portable radio signal is 1.7 GHz, 2.0 GHz, or the like depending on the communication method. The portable radio signal is a strong signal as compared with the GPS satellite signal. The frequency spectrum $S_C$ of the portable radio signal has a maximum peak MP at a portable frequency $F_C$ ($>f_G$), and has local peaks LP near the maximum peak MP, for example.

A frequency band of the frequency spectrum $S_C$ of the portable radio signal corresponding to the maximum peak MP is hereinafter referred to as "main lobe", and a frequency band other than the main lobe is hereinafter referred to as "side lobe".

A carrier is spread in the portable radio signal over a wide band by spread spectrum modulation, and the frequency spectrum $S_C$ of the portable radio signal is broad. Therefore, the side-lobe signal of the portable radio signal serves as an interference wave in the in-band IB of the received GPS satellite signal.

When the signal S1 has been output from the GPS antenna 10 to the RF receiver circuit section 20, the SAW filter 30 allows a signal component of the signal S1 in a specific band around the in-band LB of the GPS satellite signal to pass through. Specifically, a signal around the in-band IB is mainly extracted by the SAW filter 30, whereby the main-lobe signal of the portable radio signal and part of the side-lobe signal are attenuated and removed.

In the diagram of the signal S1 in FIG. 3, a signal component of the side-lobe signal of the portable radio signal at the local peak LP1 at a frequency $f_{LP1}$ ($>f_G$) included in the in-band IB passes through the SAW filter 30 while a signal component in a higher band is attenuated and removed. The LNA 40 amplifies the signal which has passed through the SAW filter 30, and outputs the amplified signal to the multiplication section 70.

The local oscillation signal generation section 50 generates the local oscillation signal S21, and outputs the generated local oscillation signal S21 to the sampling clock signal generation section 60 and the multiplication section 70. The multiplication section 70 down-converts the received signal by multiplying the signal output from the LNA 40 by the local oscillation signal S21, and outputs the resulting signal to the addition section 80 as the intermediate-frequency signal S2.

A frequency near the GPS frequency $f_G$ is generally selected as the frequency (hereinafter referred to as "oscillation frequency") $f_{LO}$ of the local oscillation signal S21. The following description is given taking an example in which a frequency higher than the GPS frequency $f_G$ to some extent is selected as the oscillation frequency $f_{LO}$.

In this case, the GPS satellite signal has an intermediate frequency $IF_G$ ($=f_{LO}-f_G$) due to down-conversion by the multiplication section 70.

When the frequency $f_{LP1}$ of the local peak LP1 of the portable radio signal is higher than the oscillation frequency $f_{LO}$ ($f_{LP1}>f_{LO}$), the signal at the local peak LP1 of the portable radio signal has an intermediate frequency $IF_{LP1}$ ($=f_{LP1}-f_{LO}$) due to down-conversion by the multiplication section 70. In the diagram of the signal S2 in FIG. 3, the vertical axis is provided at the intermediate frequency $IF_G$ of the GPS satellite signal, and the local peak LP1 after down-conversion is indicated by $LP1_d$.

In the sampling clock signal generation section 60, the frequency divider section 601 divides the frequency of the local oscillation signal S21, and outputs the resulting signal to the phase shifter section 602 as the frequency-divided signal. The phase shifter section 602 shifts the phase of the frequency-divided signal output from the frequency divider section 601 by 180 degrees, and outputs the resulting signal to the sampling circuit section 130 as the sampling clock signal S22.

The frequency spectrum of the generated signal S11 input from the portable electronic circuit to the filter 120 is the same as that of the component of the portable radio signal superimposed on the signal 51, and has the same shape as the frequency spectrum $S_C$ in the diagram of the signal 51. The filter 120 allows a signal component of the generated signal S11 in a specific band around the in-band IB of the GPS satellite signal to pass through. Therefore, the main-lobe signal and part of the side-lobe signal of the portable radio signal are attenuated and removed. In the diagram of the generated signal S11 in FIG. 3, a signal in a band higher than the local peak LP1 is removed, for example.

The sampling circuit section 130 samples the signal which has passed through the filter 120 based on the sampling clock signal S22 generated by the sampling clock signal generation section 60, and outputs the sampled signal to the attenuation section 140 as the sampled signal. Note that only sampling of the signal at the local peak LP1 is shown and described for convenience of illustration.

The frequency (hereinafter referred to as "sampling frequency") of the sampling clock signal S22 generated by dividing the frequency of the local oscillation signal S21 is indicated by "$F_S=f_{LO}/n$ (n is a constant)". The sampling frequency $f_S$ is sufficiently lower than the frequency of the portable radio signal due to frequency division by the frequency divider section 601. Therefore, the sampling circuit section 130 under-samples the signal at the local peak LP1.

Since the sampling circuit section 130 under-samples the signal at a frequency lower than the Nyquist frequency, the sampling accuracy decreases to some extent. However, since folding (aliasing) of the sampling target signal occurs due to under-sampling, the frequency can be converted using such characteristics.

Specifically, a folding peak of the local peak LP1 (hereinafter referred to as "folding peak") occurs in units of $f_S/2$ which is half of the sampling frequency $f_S$. A folding peak $LP1_S$ at a frequency $f_{LP1}-nf_S$ ($=f_{LP1}-f_{LO}$) occurs in the lowest band. The frequency $f_{LP1}-f_{LO}$ of the folding peak $LP1_S$ is equal to the frequency $IF_{LP1}$ of the local peak $LP1_d$ of the signal S2. This is equivalent to a state in which the signal at the local peak LP1 has been down-converted into a signal having the frequency $IF_{LP1}$.

Note that a plurality of folding peaks also occur in addition to the folding peak $LP1_S$. Since signals at these folding peaks are removed by the filter 100, problems do not occur.

Since the phase of the sampling clock signal S22 is the reverse of that of the local oscillation signal S21 due to phase shifting by the phase shifter section 602, the phase of the sampled signal output to the attenuation section 140 is the reverse of that of the signal S2 output from the multiplication section 70.

The attenuation section 140 attenuates the sampled signal output from the sampling circuit section 130 by a specific attenuation factor, and outputs the attenuated signal to the addition section 80 as the cancellation signal S12.

The addition section 80 adds the cancellation signal S12 output from the attenuation section 140 to the signal S2 output from the multiplication section 70, and outputs the resulting signal to the amplifier section 90 as the signal S3. The frequency spectrum of the signal S3 has a shape in which the signal level decreases in a portion of the in-band IB of the GPS satellite signal.

This is because the phase of the signal S2 is the reverse of that of the cancellation signal S12 in the in-band IB so that the signal S2 is cancelled by the cancellation signal S12 due to the addition. In particular, a signal component of the signal S2 at the local peak LP$1_d$ in the in-band IB is removed by cancellation by a signal component of the cancellation signal S12 at the folding peak LP$1_S$. Therefore, the interference wave of the portable radio signal superimposed on the signal S1 in the in-band is removed.

A signal component at the folding peak contained in the cancellation signal S12 is directly added to the out-band portion of the GPS satellite signal.

The amplifier section 90 amplifies the signal S3 output from the addition section 80, and outputs the amplified signal to the filter 100. The filter 100 allows a signal component of the signal amplified by the amplification section 90 in a band corresponding to the intermediate frequency of the GPS satellite signal (intermediate-frequency band corresponding to the in-band IB) to pass through, and outputs the signal which has passed through to the A/D conversion section 110 as the signal S4.

The signal S4 is a signal obtained by causing the filter 100 to block the out-band signal. The signal component at the folding peak superimposed by the addition of the cancellation signal S12 has been removed from the signal S4.

The A/D conversion section 110 then converts the signal which has passed through the filter 100 into a digital signal, and outputs the resulting digital signal to the baseband process circuit section 150. The baseband process circuit section 150 acquires/extracts the GPS satellite signal from the signal output from the A/D conversion section 110, decodes data contained in the GPS satellite signal, and performs positioning calculations to locate the present position of the portable telephone 1.

3. Effect

According to this embodiment, the signal received by the GPS antenna 10 passes through the SAW filter 30 and is amplified by the LNA 40. The multiplication section 70 then multiplies the resulting signal by the local oscillation signal generated by the local oscillation signal generation section 50, whereby the received signal is down-converted into an intermediate-frequency signal. A signal generated by the portable electronic circuit disposed near the GPS antenna passes through the filter 120, and is sampled by the sampling circuit section 130 using the sampling clock signal which is generated by the sampling clock signal generation section 60 and has a frequency lower than the frequency of the generated signal. The cancellation signal is generated by causing the attenuation section 140 to attenuate the signal sampled by the sampling circuit section 130. The cancellation signal is added by the addition section 80 to the intermediate-frequency signal output from the multiplication section 70, whereby in-band noise superimposed on the received signal is canceled.

The sampling circuit section 130 under-samples the signal generated by the portable electronic circuit, and converts the sampled signal into a low-frequency signal. Since the sampling circuit section 130 is disposed near the portable electronic circuit, the signal line length from the portable electronic circuit to the sampling circuit section 130 is smaller than the signal line length from the sampling circuit section 130 to the multiplication section 80. Therefore, since the signal generated by the portable electronic circuit need not be transmitted through a long signal line, a high-frequency signal which may be generated from the signal line can be effectively reduced.

According to this embodiment, since the signal generated by the portable electronic circuit is down-converted by under-sampling of the sampling circuit section 130 instead of down-converting the signal using a mixer circuit, the circuit configuration can be simplified.

Although noise in the out-band of the GPS satellite signal may not be completely canceled by the addition by the addition section 80, the out-band noise is removed by the filter 100.

4. Modification 4-1. Application Example

The invention may be applied to various electronic instruments such as a portable navigation device, a car navigation system, and a personal computer (PC) in addition to the portable telephone. Specifically, the invention may be applied to an electronic instrument including a receiver circuit which receives a signal and an electronic circuit which generates a signal that serves as an interference wave (noise) for the received signal.

The receiver circuit may be various communication circuits other than a GPS signal receiver circuit. The electronic circuit which generates an interference wave for the signal received by the receiver circuit may be various processors, various communication circuits, and the like.

4-2. Satellite Positioning System

The above embodiments have been described taking the GPS as an example of the satellite positioning system. Note that the invention may also be applied to other satellite positioning systems such as WAAS, QZSS, GLONASS, and GALILEO.

4-3. Module

The above embodiment has been described taking an example in which the module B including the filter 120, the sampling circuit section 130, and the attenuation section 140 is disposed in the RF receiver circuit section 20. Note that the module B may be disposed at a position separated from the RF receiver circuit section 20, and may be connected with the RF receiver circuit section 20 through a signal line or the like.

Figure 4:
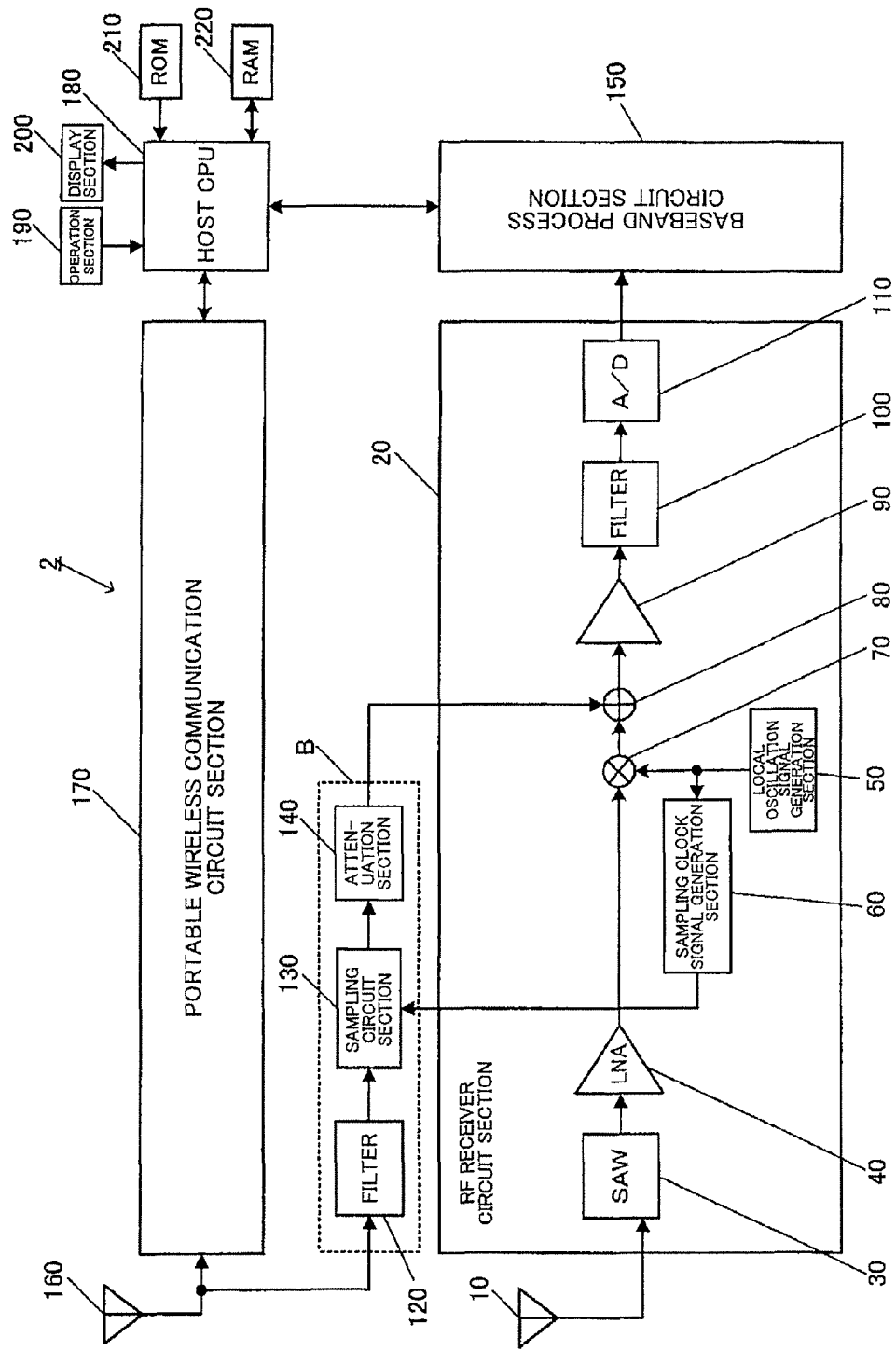
FIG. 4 is a block diagram showing the configuration of a portable telephone according to a modification.

FIG. 4 is a block diagram showing the configuration of a portable telephone 2 according to this modification. In the portable telephone 2, the module B is disposed near the portable electronic circuit including the portable antenna 160 and the portable wireless communication circuit section 170. In this case, since the signal generated by the portable electronic circuit need not be transmitted through a long signal line, leakage of the generated signal can be reduced.

4-4. Noise Cancellation Circuit

The noise cancellation circuit may be formed by incorporating the sampling clock signal generation section 60 in the module B instead of the module A.

Figure 5:
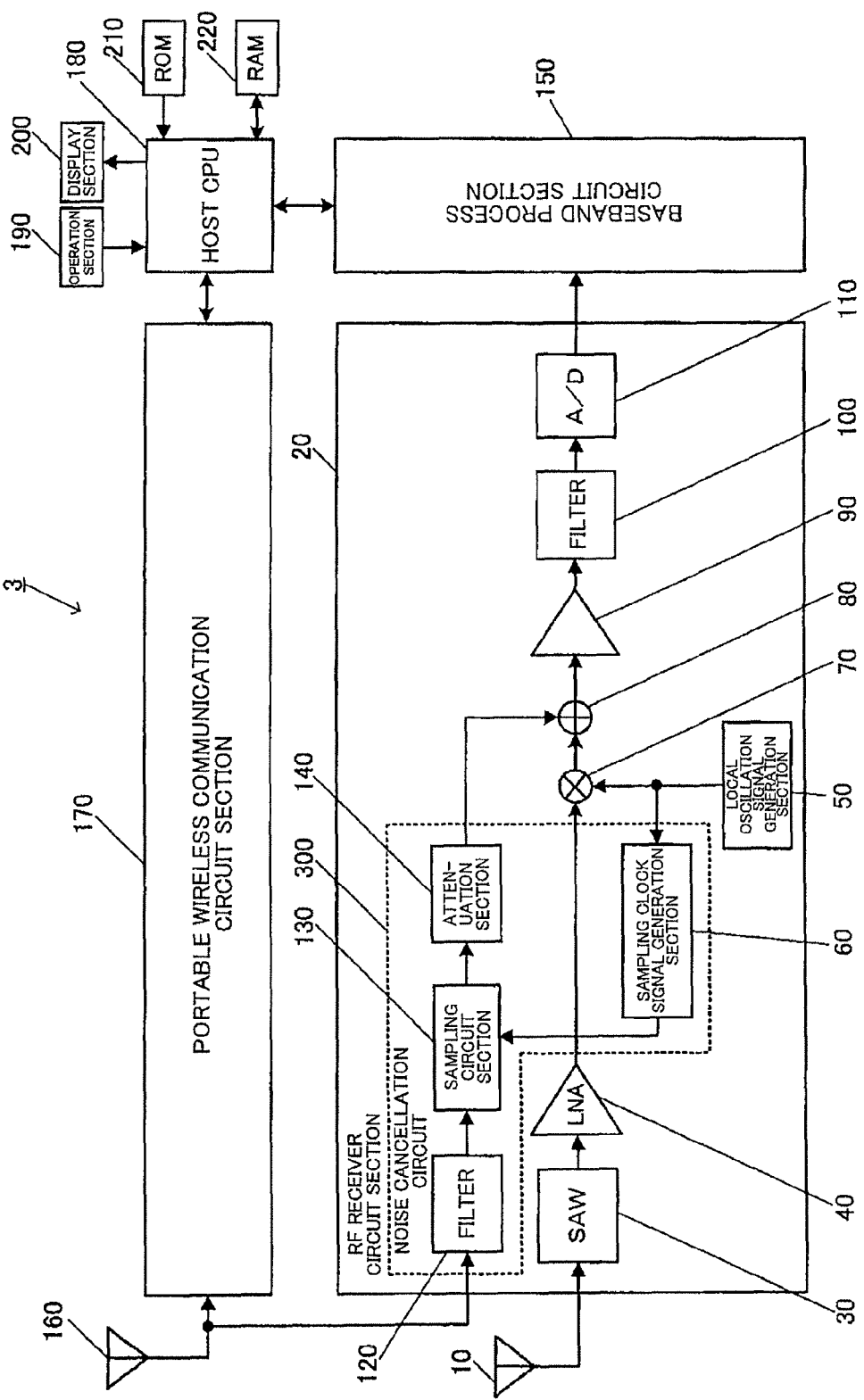
FIG. 5 is a block diagram showing the configuration of a portable telephone according to another modification.

FIG. 5 is a block diagram showing the configuration of a portable telephone 3 when incorporating the sampling clock signal generation section 60 in the module B. As indicated by a broken line shown in FIG. 5, the portable telephone 3 includes a noise cancellation circuit 300 in which the sampling clock signal generation section 60, the filter 120, the sampling circuit section 130, and the attenuation section 140 are integrated. The noise cancellation circuit 300 is connected with the RF receiver circuit section 20 through interconnects. Although the noise cancellation circuit 300 is shown disposed in the RF receiver circuit section 20 for convenience of illustration, the RF receiver circuit section 20 is separated from the noise cancellation circuit 300. In this case, the received signal processing system can be separated from the noise cancellation processing system.

4-5. Attenuation Section

The attenuation section 140 may adjust the attenuation factor based on the signal after noise cancellation. This is because an electronic circuit provided near the reception section does not necessarily always perform a constant circuit operation and may appropriately change the circuit operation depending on operation/suspension and the like.

Specifically, the signal output from the filter 100 is input to the attenuation section 140 so that the signal after noise cancellation which has passed through the filter 100 is fed back to the attenuation section 140. The attenuation section 140 adjusts the attenuation factor based on the feedback signal.

Figure 6:
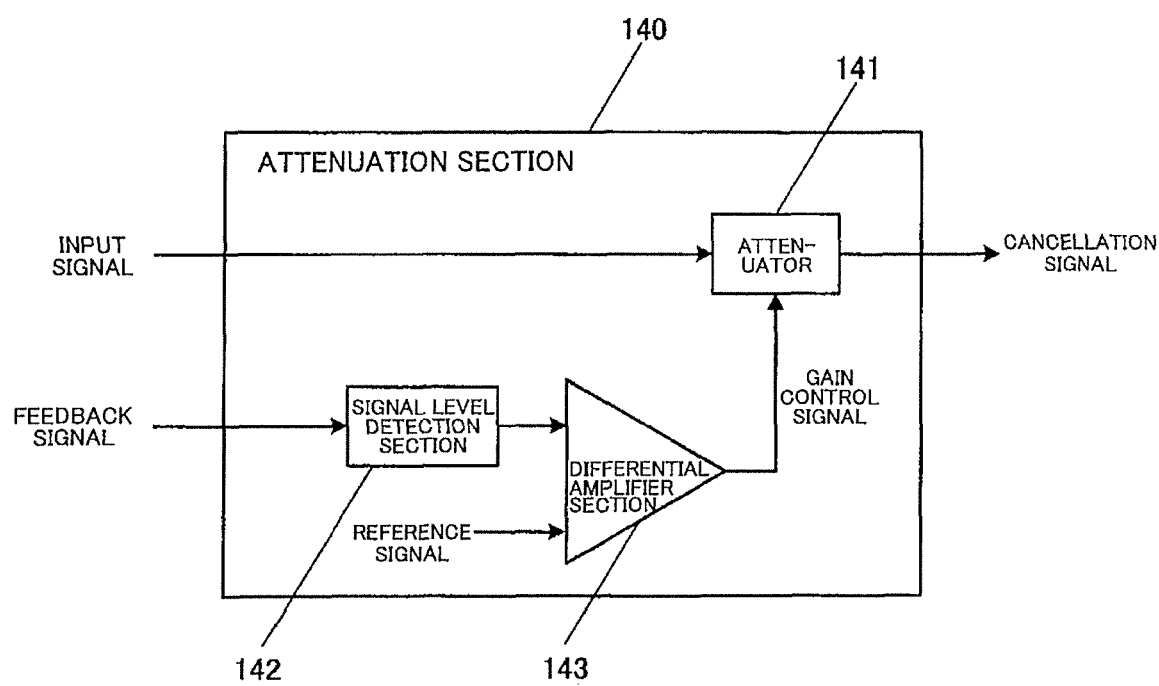
FIG. 6 is a view showing an example of the circuit configuration of an attenuation section according to a further modification.

FIG. 6 is a block diagram showing the circuit configuration of the attenuation section 140 according to this modification. The attenuation section 140 includes an attenuator 141, a signal level detection section 142, and a differential amplifier section 143.

The attenuator 141 is a variable attenuator which attenuates the input signal by an attenuation factor corresponding to an attenuation factor control signal (hereinafter referred to as "gain control signal") output from the differential amplifier section 143. The attenuator 141 outputs the attenuated signal to the addition section 80 as the cancellation signal.

The signal level detection section 142 is a circuit section including a known signal level detection circuit. The signal level detection section 142 detects the signal level of the feedback signal, and outputs the detected signal level to the differential amplifier section 143.

The differential amplifier section 143 is a known differential amplifier circuit including an operational amplifier and the like. The differential amplifier section 143 compares the signal level of the signal detected by the signal level detection section 142 with the signal level of a reference signal, and outputs a signal corresponding to the difference to the attenuator 141 as the gain control signal. The reference signal is generated by dividing a specific voltage, for example.

According to this configuration, the attenuation factor can be adjusted by feeding back the noise cancellation result. Therefore, even if the signal level of the signal generated by the electronic circuit has changed, a cancellation signal with an appropriate signal level can be generated, as necessary.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A receiver circuit, comprising:
   an antenna that receives a radio signal to output a received signal;
   an intermediate frequency converter that converts the received signal into an intermediate-frequency signal;
   a sampling circuit that samples a generated signal to output a sampled signal using a sampling clock signal that has a specific frequency lower than a frequency of the generated signal, the generated signal being generated by an electronic circuit;
   an adder that adds the sampled signal to the intermediate-frequency signal to output an added signal;
   a filter that extracts a component in a band corresponding to an intermediate frequency of the radio signal from the added signal.

2. The receiver circuit as defined in claim 1, further comprising:
   a local oscillator that generates a local oscillation signal;
   a sampling clock signal generator that generates the sampling clock signal by dividing a frequency of the local oscillation signal to output a divided signal and shifting a phase of the divided signal by 180 degrees.

3. The receiver circuit as defined in claim 1, wherein:
   a wiring length from the electronic circuit to the sampling circuit is smaller than a wiring length from the sampling circuit and the adder.

4. The receiver circuit as defined in claim 2, further comprising:
   a second filter that extracts a component in a band of the radio signal from the generated signal to output a filtered signal, wherein
   the sampling circuit samples the filtered signal.

5. The receiver circuit as defined in claim 1, further comprising:
   an attenuator that attenuates the sampled signal to output an attenuated signal, wherein
   the adder adds the attenuated signal to the intermediate-frequency signal.

6. The receiver circuit as defined in claim 1, wherein:
   the radio signal is a satellite signal from a positioning satellite.

7. An electronic instrument, comprising:
   an electronic circuit that generates a noise signal;
   an antenna that receives a radio signal to output a received signal;
   an intermediate frequency converter that converts the received signal into an intermediate-frequency signal;
   a sampling circuit that samples the noise signal to output a sampled signal using a sampling clock signal that has a specific frequency lower than a frequency of the generated signal;
   an adder that adds the sampled signal to the intermediate-frequency signal to output an added signal;
   a filter that extracts a component in a band corresponding to an intermediate frequency of the radio signal from the added signal.

8. The electronic instrument as defined in claim 7, wherein:
   the electronic circuit is a wireless communication circuit.

9. The electronic instrument as define in claim 8, wherein:
   the electronic instrument is a portable telephone.

10. A signal receiving method, comprising:
    generating a generated signal;
    receiving a radio signal to output a received signal;
    converting the received signal into an intermediate-frequency signal;
    sampling the generated signal to output a sampled signal using a sampling clock signal that has a specific frequency lower than a frequency of the generated signal;
    adding the sampled signal to the intermediate-frequency signal to output an added signal;
    extracting a component in a band corresponding to an intermediate frequency of the radio signal from the added signal.

* * * * *